E. HIPPARD & E. P. ROSS.
Tire-Tightener.
No. 221,679.  Patented Nov. 18, 1879.
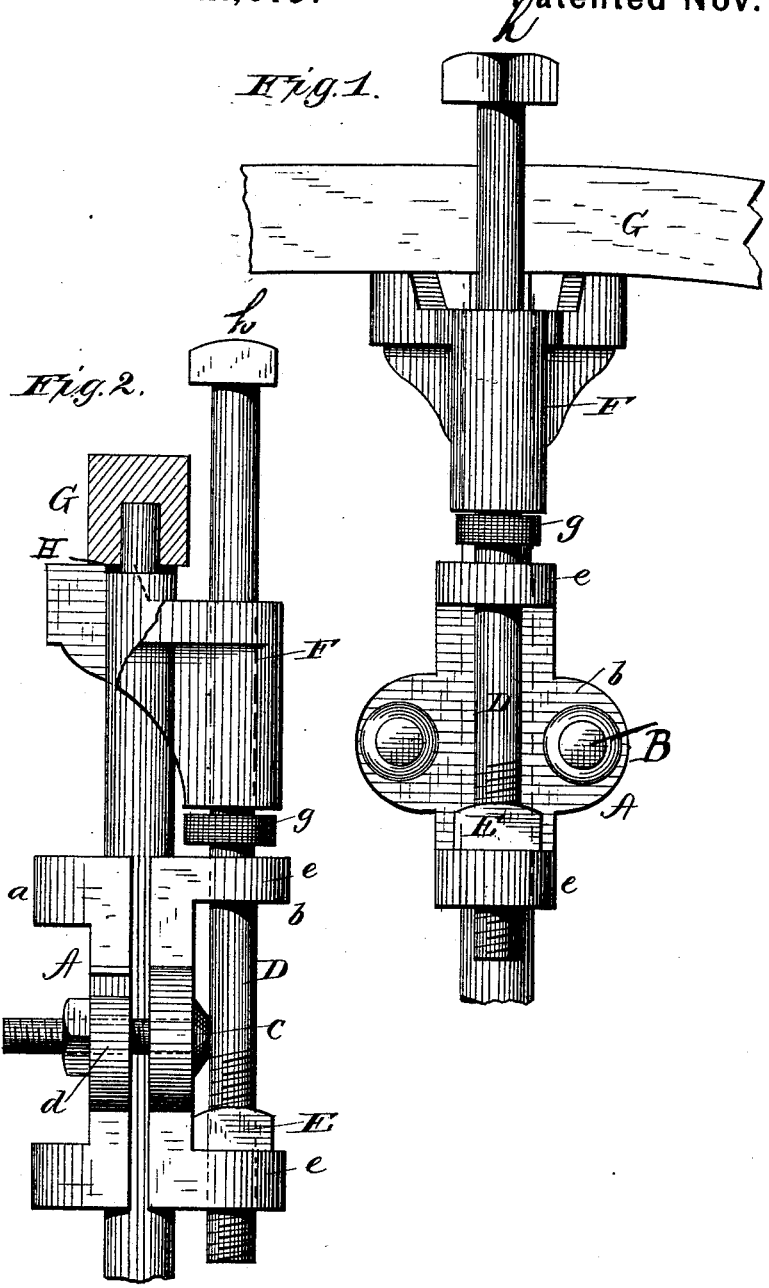

UNITED STATES PATENT OFFICE.

EMANUEL HIPPARD AND EZRA P. ROSS, OF LEBANON, PENNSYLVANIA.

IMPROVEMENT IN TIRE-TIGHTENERS.

Specification forming part of Letters Patent No. 221,679, dated November 18, 1879; application filed October 11, 1879.

*To all whom it may concern:*

Be it known that we, E. HIPPARD and E. P. ROSS, of Lebanon, in the county of Lebanon and State of Pennsylvania, have invented certain new and useful Improvements in Tire-Tighteners; and we do hereby declare the following to be a full, clear, and exact description of the invention, such as will enable others skilled in the art to which it appertains to make and use the same, reference being had to the accompanying drawings, and to letters of reference marked thereon, which form a part of this specification.

This invention relates to an improved device for adjusting the felly of a wheel upon the spokes of the same without the necessity of cutting or altering the tire for the purpose; and to this end it consists of a clamp provided with a screw-threaded shaft having a square head for operating it, and having a fixed collar, operating a movable dog, all of which will be hereinafter more fully described, and particularly pointed out in the claim.

In the drawings, Figure 1 represents a front elevation of the device, showing the same in position upon the spoke, and ready for use to raise the felly, and Fig. 2 represents a side elevation of the device detached from the wheel.

The letter A indicates a clamp formed in two parts, *a b*, and adapted to be secured to one of the spokes of a wheel by means of the screw-bolts B, passing through apertures *c* in the part *b* and open slots *d* in the part *a* of the clamp. The said part *b* of the clamp is provided with lugs *e*, which form bearings for an adjusting-shaft, D, which is screw-threaded at its lower end, the said screw-threaded portion passing through a screw-nut, E, which bears against the lower standard, *e*, and causes the shaft D to be elevated or lowered when turned in the proper direction. The said shaft is provided with a shoulder or abutment, *g*, just above the upper standard of the clamp, and carries a loosely-fitted forked or bifurcated dog, F, the upper ends of which straddle the spoke, and are adapted to set under the inner side of the felly G. The upper end of the shaft D is provided with a squared head, *h*, to which a proper tool may be applied for operating the shaft.

The operation of our improved device is as follows: The clamp is secured upon the spoke, as shown in Fig. 1, the two parts being made to embrace it and held together by the screw bolts and nuts. The bifurcated parts of the dog are placed against the inner edge of the felly, and upon rotating the screw-shaft in the proper direction it will be elevated, the shoulder or abutment thereon elevating the bifurcated dog and lifting the felly away from the shoulder at the end of the spoke a sufficient distance to admit of the insertion of a split washer, H, of leather or other similar material, by means of which the felly may be tightened upon the wheel readily and conveniently.

Having thus fully described our invention, and the manner of its operation, what we claim, and desire to secure by Letters Patent, is—

The clamp A, provided with the shaft D, having square head *h*, nut E, and collar *g*, in combination with the dog F, substantially as shown and described.

In testimony that we claim the foregoing we have hereunto set our hands this 16th day of September, 1879.

EMANUEL HIPPARD.
EZRA P. ROSS.

Witnesses:
J. F. BEHNY,
A. B. SCHUPP.